United States Patent Office 3,082,079
Patented Mar. 19, 1963

3,082,079
SILVER RECOVERY FROM PHOTOGRAPHIC FIXING SOLUTIONS
David K. Bulloch and Deane S. Thomas, Rochester, N.Y., assignors to Eastman Kodak Company, Rochester, N.Y., a corporation of New Jersey
No Drawing. Filed June 15, 1960, Ser. No. 36,134
1 Claim. (Cl. 75—108)

This invention relates to the recovery of silver from seasoned sodium thiosulfate fixing solutions and more particularly to a method of silver recovery which employs sodium or potassium borohydride as the silver recovery agent.

The recovery of silver from seasoned fixing baths is of importance not only for the value of the silver recovered, but also for the improvement in the efficiency of fixation accompanying a reduction in the concentration of silver salts in the fixing bath.

Electrolytic recovery is a common commercial method of removing silver from a fixing bath that is intended to be reused. Aside from the high initial capital investment, operating conditions are critical and the apparatus requires frequent attention.

Chemical methods are commonly employed when the fix is not destined for reuse. Metallic replacement or precipitation as silver sulfide are common chemical methods and both methods often result in the formation of undesirable addenda to the fixing bath.

An object of the present invention is an improved method of removing silver from ammonium or sodium thiosulfate fixing baths. Other objects will appear hereinafter.

In accordance with the present invention, these objects are attained by adding to a seasoned ammonium or sodium thiosulfate fixer substantial amounts of sodium or potassium borohydride. These alkali borohydrides are strong reducing agents and their reducing action causes the precipitation of metallic silver which can be removed from the fixing solution by filtration, settling or centrifugation.

The silver reduction proceeds as follows:

(1)     $BH_4^- + 8Ag^+ + 2H_2O \rightarrow 8Ag^0 + BO_2^- + 8H^+$

Two other reactions are of importance: (2) the acid catalyzed decomposition of water by borohydride ion and (3) the possible reduction of thiosulfate ion, i.e.

(2)

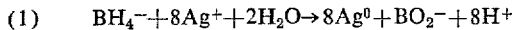

(3)

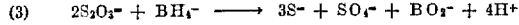

The following examples further illustrate our invention.

*Example 1*

An ammonium thiosulfate bath was made up of the following:

| | Grams |
|---|---|
| $(NH_4)_2S_2O_3$ | 61 |
| $NaHSO_3$ | 1.7 |
| $Na_2SO_3$ | 2.6 |
| $H_2O$ to 1 liter. | |

The pH of this solution was 6.9.

*Example 2*

A sodium thiosulfate fixing bath was made up of the following:

| | Grams |
|---|---|
| $Na_2S_2O_3 \cdot 5H_2O$ | 180 |
| $Na_2SO_3$ | 9 |
| Water to 1 liter. | |

The pH of this solution was 7.8.

To simulate the effect of seasoned fixing baths, enough silver bromide was added to both fixers to adjust the silver ion concentration of each of the above baths to 5 grams per liter.

Stoichiometric addition of sodium or potassium borohydride resulted in the precipitation of 90% of the silver ion in the fixing bath of Example 1 within 10 minutes and 65% of the silver ion in the fixing bath of Example 2 within 45 minutes.

The pH of the fixing bath determines the recovery yield and the rate of the undesirable side reactions of Equations 2 and 3, supra. For example, at pH 4.3, using a fixing solution containing 5 g./l. of silver ion, an almost negligible amount of silver was recovered and considerable hydrogen gas evolution occurred when a stoichiometric amount of sodium borohydride was added. At pH 9 and above, the fixing bath of Example 2 contained silver sulfide and hydrogen sulfide after the addition of a stoichiometric amount of sodium borohydride.

*Example 3*

A used sodium thiosulfate fixing bath having a composition similar to that of Example 1 and containing complex silver thiosulfate compounds such as $NaAgS_2O_3$ and $Na_4Ag_2(S_2O_3)_3$ was treated by adding sodium borohydride in an amount stoichiometrically equal to the amount of said silver compounds. Substantially a theoretical yield of free silver resulted.

The addition of more than a stoichiometric amount of borohydride ion does not appreciably increase the recovery yield of silver but does disadvantageously increase the rate of reaction (3), supra. Addition of five times the stoichiometric amount of sodium borohydride in Examples 1 and 2 results in the disadvantageous formation of considerable silver sulfide.

This experimental evidence shows that the optimum precipitation of silver occurs upon the addition of near stoichiometric amounts of borohydride ion to a thiosulfate fixing bath, the pH of which is approximately 6 to 8. Many of the fixing baths used in commercial processes normally have a pH in this 6 to 8 range.

Treatment of a seasoned fixing bath with borohydride ion in the manner described did not alter the sensitometric effects of the fixing solution when employed in a reversible color process having couplers in the emulsion.

We claim:

A method of recovering metallic silver from a thiosulfate photographic fixing bath containing complex silver thiosulfate compounds and having a pH within the range of approximately 6 to 8 which comprises adding an alkali metal borohydride selected from the group consisting of sodium borohydride and potassium borohydride to said bath in amount approximately stoichiometrically equal to the amount of silver compound in the bath and separating the metallic silver from the bath, said bath, after silver separation, being reusable as a photographic fixing bath.

References Cited in the file of this patent

UNITED STATES PATENTS 2,194,056  Quaglia _____ Mar. 19, 1940
2,461,661  Schlesinger et al. _____ Feb. 15, 1949

Dedication 3,082,079.—*David K. Bulloch* and *Deane S. Thomas*, Rochester, N.Y. SILVER RECOVERY FROM PHOTOGRAPHIC FIXING SOLUTIONS. Patent dated Mar. 19, 1963. Dedication filed May 8, 1975, by the assignee, *Eastman Kodak Company*.

Hereby dedicates to the Public the entire remaining portion of the term of said patent.

[*Official Gazette July 22, 1975.*]